(12) United States Patent
Smith et al.

(10) Patent No.: US 6,327,561 B1
(45) Date of Patent: Dec. 4, 2001

(54) CUSTOMIZED TOKENIZATION OF DOMAIN SPECIFIC TEXT VIA RULES CORRESPONDING TO A SPEECH RECOGNITION VOCABULARY

(75) Inventors: Maria E. Smith, Plantation, FL (US); Bernard John Grainger, Winchester (GB); Hubert Crépy, Boulogne (FR); Martin Herzog, Griesheim (DE); Gerhard Backfried, Purkersdorf (AT)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/348,516

(22) Filed: Jul. 7, 1999

(51) Int. Cl.[7] ............................. G06F 17/27; G10L 15/18
(52) U.S. Cl. .................. 704/9; 704/10; 704/257
(58) Field of Search ............................. 704/9, 10, 1, 231, 704/251, 255, 257, 270; 707/531, 532, 533, 1, 5, 6

(56) References Cited

U.S. PATENT DOCUMENTS

| | | | |
|---|---|---|---|
| 4,991,094 | * 2/1991 | Fagan et al. | 704/9 |
| 5,687,384 | * 11/1997 | Nagese | 704/9 |
| 5,721,939 | * 2/1998 | Kaplan | 704/9 |
| 5,774,888 | * 6/1998 | Light | 707/1 |
| 5,890,103 | * 3/1999 | Carus | 704/9 |
| 5,937,422 | * 8/1999 | Nelson et al. | 707/531 |
| 5,960,384 | * 9/1999 | Brash | 704/9 |
| 6,125,377 | * 9/2000 | Razin | 707/531 |

FOREIGN PATENT DOCUMENTS 287 310 A2 * 10/1988 (EP).

* cited by examiner

*Primary Examiner*—Joseph Thomas
(74) *Attorney, Agent, or Firm*—Akerman Senterfitt

(57) ABSTRACT

A method for supporting customized tokenization of domain-specific text acomprises the steps of: loading domain-specific tokenization rules corresponding to the customized tokenization of the domain-specific text; tokenizing the domain-specific text using the loaded domain-specific tokenization rules; and, further tokenizing the domain-specific text using general purpose tokenization rules. The loading step of the inventive method can comprise: loading a speech recognition vocabulary; and, loading domain-specific tokenization rules corresponding to the speech recognition vocabulary. In addition, the tokenizing step can comprise identifying each substring in the domain-specific text matching a regular expression having a corresponding replacement pattern in the loaded domain-specific tokenization rules, and replacing each substring identified in the identifying step with the replacement pattern corresponding to the matched regular expression. Alternatively, the tokenizing step can comprise identifying substrings in the domain-specific text matching a regular expression having a corresponding replacement pattern in the second loaded domain-specific tokenization rules; excluding from further processing the identified substrings having a do-not-replace marker associated with the identified substring; and, replacing each non-excluded identified substring with the replacement pattern corresponding to the matched regular expression.

17 Claims, 5 Drawing Sheets

CUSTOMIZED TOKENIZATION OF DOMAIN SPECIFIC TEXT VIA RULES CORRESPONDING TO A SPEECH RECOGNITION VOCABULARY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of text tokenization and more particularly to a method and system for supporting customized tokenization of domain-specific text.

2. Description of the Related Art

Tokenization is the process of separating text into words, punctuation and optionally, phrases. Tokenization can include case folding of words at the beginning of a sentence and special formatting modifications to an input string, such as is sometimes done with numbers. Tokenization plays a critical role in the building of speech recognition vocabularies. Tokenization can also be used in coordination with other components of a speech recognition system, for instance with a speech correction tool or a speech analysis tool for updating a system language model. To ensure consistency, it is essential to have one common tokenizer for all applications needing a particular type of token processing so that the concept of what makes up a word remains in agreement.

The inherent difficulty associated with processing a variety of electronic text can cause the expansion of the complexity of the source code forming the tokenization program. Typically, several hundred lines of source code are needed to form a tokenization program able to convert written forms to spoken forms, dividing character streams at logical word boundaries. Tokenization code can become particularly complex and troublesome in view of the multiple uses for common symbols, such as the apostrophe, comma, period and numbers. Since general purpose tokenizers cannot correctly process text in all domains, it is essential that vocabulary builders have the flexibility to customize this process. Specifically, when building a new vocabulary, it is common to make minor modifications to the general purpose tokenizer in order to correctly tokenize domain-specific strings.

Present systems address the need for context-specific tokenization, also referred to as domain-specific tokenization, in two ways. First, a vocabulary requiring special tokenization can be distributed without a vocabulary-specific tokenizer. The general-purpose tokenizer can then be used by the speech recognition system when the vocabulary becomes active, for instance during correction. In consequence, the tokenization used in building the vocabulary can differ from the tokenization used for updating the system language model. Second, as an alternative, a vocabulary requiring special tokenization can be distributed with a vocabulary-specific tokenizer which includes general purpose rules in addition to domain-specific rules.

Where a vocabulary requiring special tokenization is distributed without a vocabulary-specific tokenizer, inconsistencies can arise between the vocabulary and the personal language model. In the alternative case, where a vocabulary is distributed with a vocabulary-specific tokenizer, improvements or bug fixes directed toward future versions of the general purpose tokenizer will require rebuilding and redistributing the vocabulary-specific tokenizer of the domain-specific vocabulary. Furthermore, external software developers building vocabularies will not be able to develop vocabulary-specific tokenizers because the external developers lack the proprietary knowledge of the speech recognition system necessary for the development of the general-purpose tokenizer. Thus, no present system provides for a flexible customized tokenization system, capable of processing vocabulary-specific tokenization schemes while treating all vocabularies uniformly. Accordingly, there is a long-felt need for a flexible tokenization system, capable of processing vocabulary-specific tokenization schemes while treating all vocabularies uniformly.

SUMMARY OF THE INVENTION

A flexible tokenization system, in accordance with the inventive arrangement, satisfies the long-felt need of the prior art by processing vocabulary-specific tokenization schemes while treating all vocabularies uniformly. Thus, the inventive arrangements provide a method and system for supporting customized tokenization of domain-specific text. The inventive arrangements have advantages over all known tokenization methods, and provide a novel and nonobvious system, including apparatus and method, for supporting customized tokenization of domain-specific text. A method for supporting customized tokenization of domain-specific text in accordance with the inventive arrangements comprises the steps of: loading domain-specific tokenization rules corresponding to the customized tokenization of the domain-specific text; tokenizing the domain-specific text using the loaded domain-specific tokenization rules; and, further tokenizing the domain-specific text using general purpose tokenization rules.

The loading step can comprise: loading a speech recognition vocabulary; and, loading domain-specific tokenization rules corresponding to the speech recognition vocabulary. In addition, the tokenizing step can comprise identifying each substring in the domain-specific text matching a regular expression having a corresponding replacement pattern in the loaded domain-specific tokenization rules, and replacing each substring identified in the identifying step with the replacement pattern corresponding to the matched regular expression. However, to accomodate the circumstance where the exclusion of particular domain-specific text from domain-specific tokenization is desired, the tokenizing step can comprise identifying substrings in the domain-specific text matching a regular expression having a corresponding replacement pattern in the second loaded domain-specific tokenization rules; excluding from further processing the identified substrings having a do-not-replace marker associated with the identified substring; and, replacing each non-excluded identified substring with the replacement pattern corresponding to the matched regular expression.

Alternatively, the loading step can comprise first loading an active vocabulary, identifying domain-specific tokenization rules corresponding to the active vocabulary, and second loading the domain-specific tokenization rules identified in the identifying step. In the alternative case, the tokenizing step can comprise checking for the second loaded domain-specific tokenization rules, and processing the domain-specific text using the second loaded domain-specific tokenization rules only if the second loaded domain-specific tokenization rules are identified in the checking step.

Moreover, the processing step can comprise identifying each substring in the domain-specific text matching a regular expression having a corresponding replacement pattern in the second loaded domain-specific tokenization rules, and replacing each substring identified in the identifying step with the replacement pattern corresponding to the matched regular expression. As before, to accomodate the circumstance where the exclusion of particular domain-specific text from domain-specific tokenization is desired, the tokenizing step can comprise identifying substrings in the domain-specific text matching a regular expression having a corresponding replacement pattern in the second loaded domain-specific tokenization rules; excluding from further processing the identified substrings having a do-not-replace marker associated with the identified substring; and, replacing each non-excluded identified substring with the replacement pattern corresponding to the matched regular expression.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
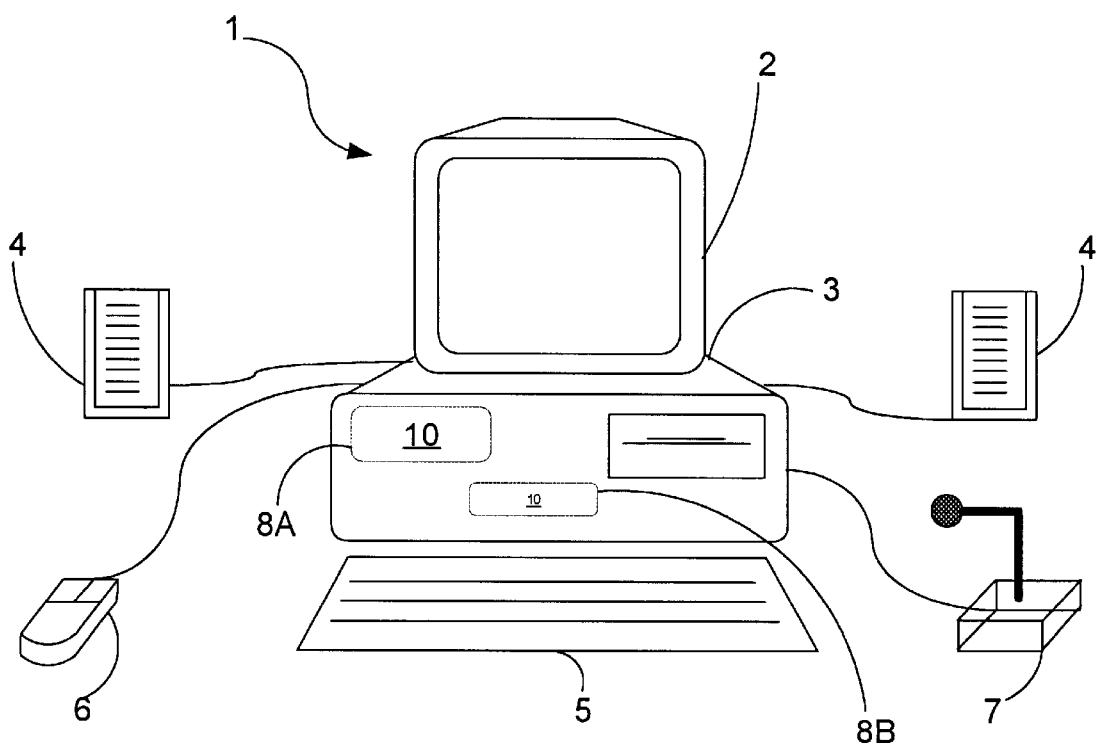
FIG. 1 is a pictorial representation of a computer system for speech recognition on which the system of the invention can be used.

FIG. 1 shows a typical computer system 1 for use in conjunction with the present invention. The system preferably comprises a computer 3 including a central processing unit (CPU), one or more memory devices and associated circuitry. The system also includes a microphone 7 operatively connected to the computer system through suitable interface circuitry or "sound board" (not shown), a keyboard 5, and at least one user interface display unit 2 such as a video data terminal (VDT) operatively connected thereto. The CPU can include any suitable microprocessor or other electronic processing unit, as is well known to those skilled in the art. An example of such a CPU would include the Pentium or Pentium II brand microprocessor available from Intel Corporation, or any similar microprocessor. Speakers 4, as well as an interface device, such as mouse 6, can also be provided with the system, but are not necessary for operation of the invention as described herein. The various hardware requirements for the computer system as described herein can generally be satisfied by any one of many commercially available high speed multimedia personal computers offered by manufacturers such as International Business Machines (IBM), Compaq, Hewlett Packard and Apple Computers.

Figure 2:
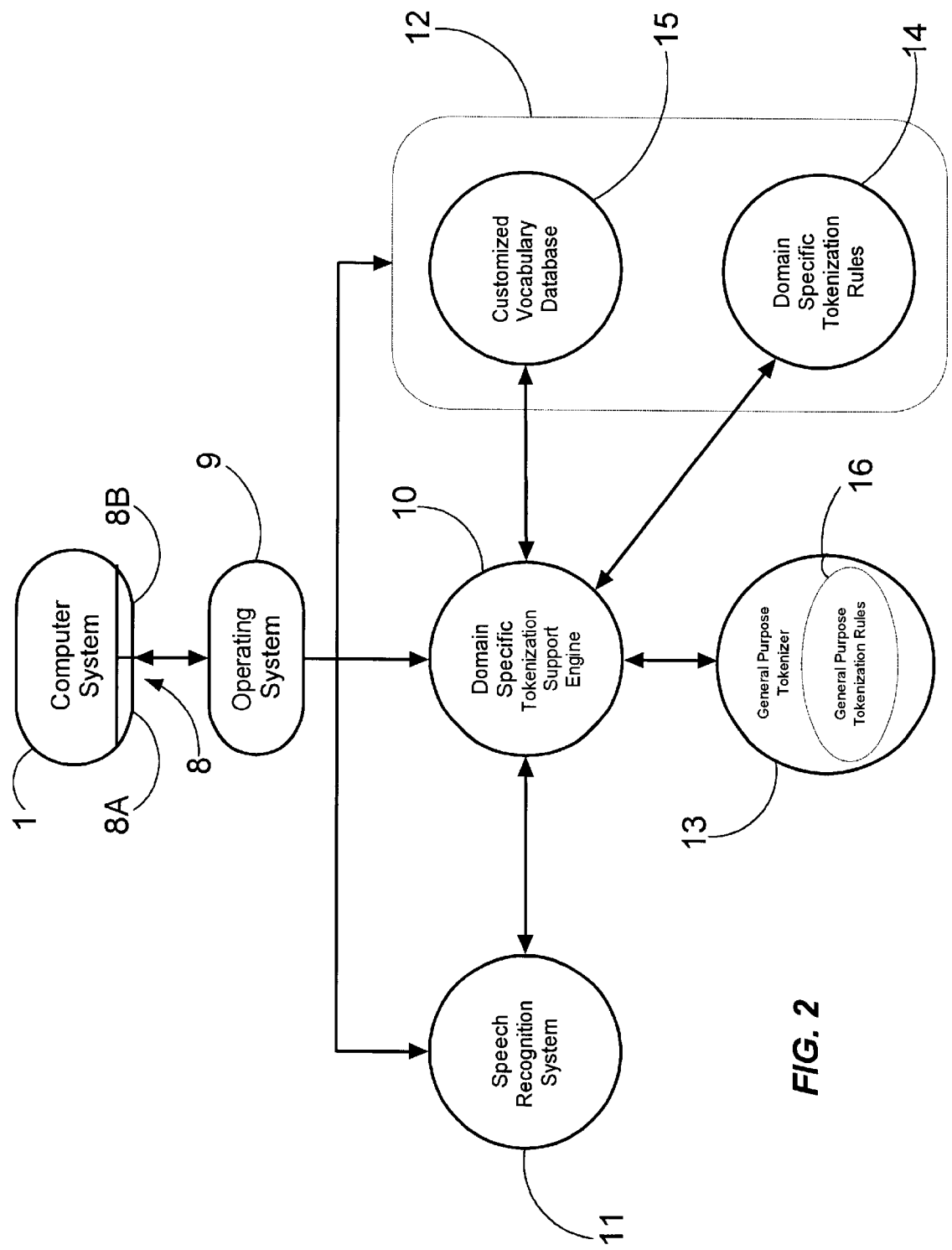
FIG. 2 is a block diagram showing a typical high level architecture for the domain-specific tokenization support system in accordance with the inventive arrangements and as implemented on the computer system of FIG. 1.

FIG. 2 illustrates a presently preferred architecture for a domain-specific tokenization support system in accordance with the inventive arrangements and as implemented in the speech recognition system in computer 1. As shown in FIG. 2, computer system 1 includes one or more computer memory devices 8, preferably an electronic random access memory 8A and a bulk data storage medium, such as a magnetic disk drive 8B. The system can include an operating system 9, a speech recognition system 11, a domain-specific tokenization support engine 10 in accordance with the inventive arrangements, and a loaded active vocabulary 12. In a preferred embodiment described herein, operating system 9 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system.

In FIG. 2, the domain-specific tokenization support engine 10, the speech recognition system 11, and the loaded active vocabulary 12 are shown as separate modules. It should be noted, however, that the invention is not limited in this regard, and these various modules can, of course, be implemented as a single, more complex applications program. Domain-specific tokenization support engine 10 preferably comprises a general purpose tokenizer 13 having general purpose tokenization rules 16. Moreover, domain-specific tokenization support engine 10 maintains an association with the loaded active vocabulary 12. The loaded active vocabulary 12 can include two individual components: customized vocabulary 15 and domain-specific tokenization rules 14, to be used in conjunction with customized vocabulary 15. The system as disclosed herein can be implemented by a programmer, using commercially available development tools for the operating systems described above.

Figure 3:
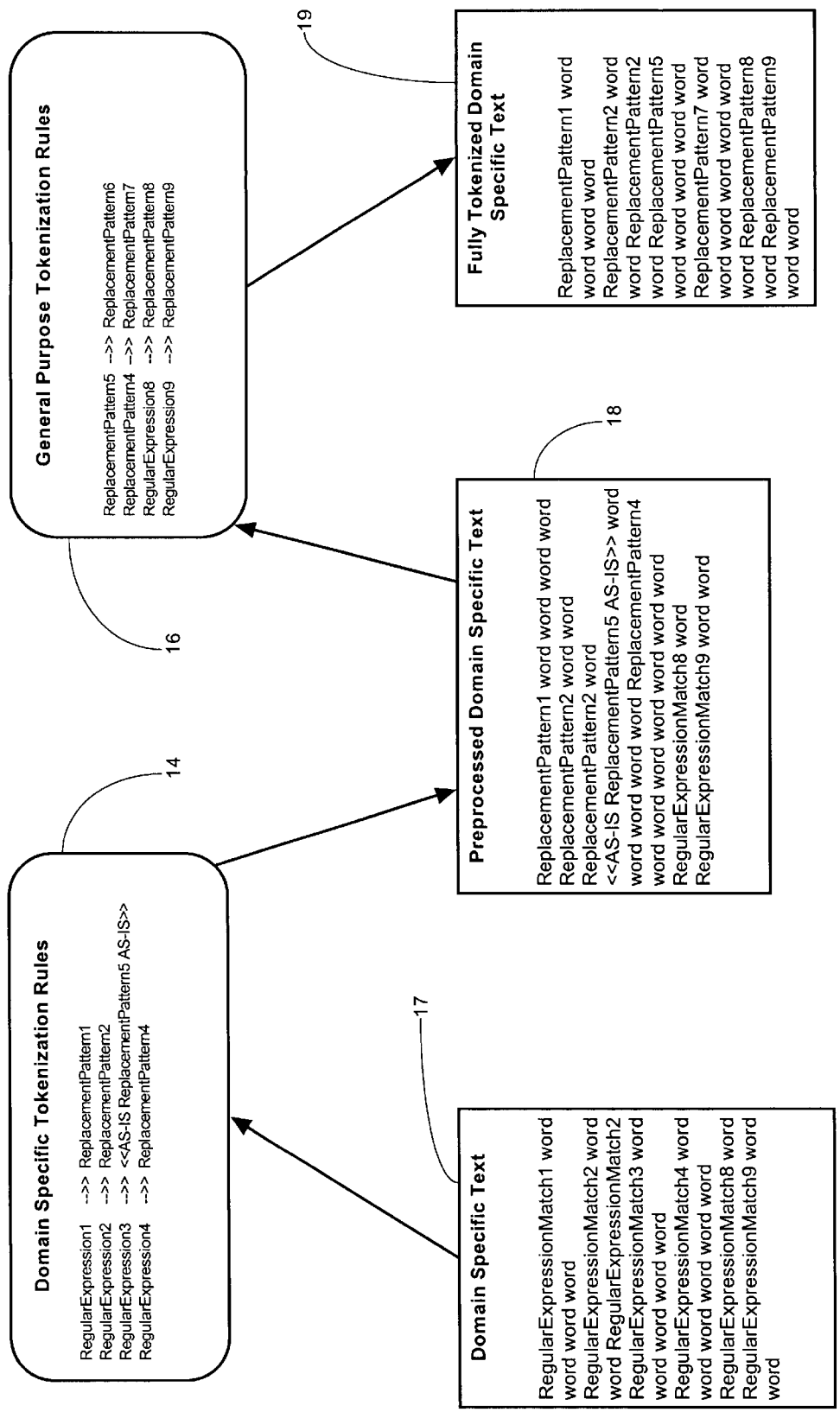
FIG. 3 is a block diagram illustrating a process for supporting the customized tokenization of domain-specific text.

FIG. 3 is a block diagram illustrating the inventive process for supporting the customized tokenization of domain-specific text. FIG. 3 shows the contents of domain-specific tokenization rules 14. Domain-specific tokenization rules preferably can include an aggregation of replacement patterns corresponding to regular expressions. When applying tokenization rules, in general, a tokenizer preferably can search through text for substrings matching any one of the regular expressions contained in the aggregation of tokenization rules. Upon identifying a matching substring, the tokenizer preferably can replace the matching substring with a replacement pattern corresponding to the matching regular expression.

In FIG. 3, unprocessed domain-specific text 17 can be preprocessed using domain-specific tokenization rules 14. Specifically, each substring contained in domain-specific text 17 preferably can be replaced with a corresponding replacement pattern contained in domain-specific tokenization rules 14 resulting in preprocessed domain-specific text 18. For instance, as shown in domain-specific text 17, the RegularExpressionMatch1 substring matching RegularExpression1 in domain-specific tokenization rules 14 will be replaced with ReplacementPattern1 in domain-specific tokenization rules 14. Similarly, the RegularExpression-Match4 substring matching RegularExpression4 in domain-specific tokenization rules 14 will be replaced with ReplacementPattern4 in domain-specific tokenization rules 14. However, where excluding particular substrings in domain-specific text 17 from tokenization is desired, the particular substrings can be enclosed with the special do-not-replace markers, "<<AS-IS" and "AS-IS>>". In that instance, the replacement pattern inserted into the preprocessed domain-specific text 18 will not be further tokenized by the general purpose tokenizer 13.

Subsequent to the preprocessing step, preprocessed domain-specific text preferably can be passed to the general purpose tokenizer 13 where each substring contained in preprocessed domain-specific text 18 preferably can be replaced with a corresponding replacement pattern contained in general purpose tokenization rules 16 resulting in fully tokenized domain-specific text 19. For example, RegularExpressionMatch8 substring matching RegularExpression8 in general purpose tokenization rules 16 will be replaced with ReplacementPattern8 in general purpose tokenization rules 16. One skilled in the art will recognized that replacement pattern inherently can be regarded as a regular expression. For instance, the substring ReplacementPattern4 in preprocessed domain specific text 18 will be replaced with ReplacementPattern7 in general purpose tokenization rules 16. Notwithstanding, the substring ReplacementPafttern5 surrounded by the do-not-replace markers in preprocessed domain specific text 18 will not be replaced by the ReplacementPattern5 rule in general purpose tokenization rules 16.

Figure 4A:
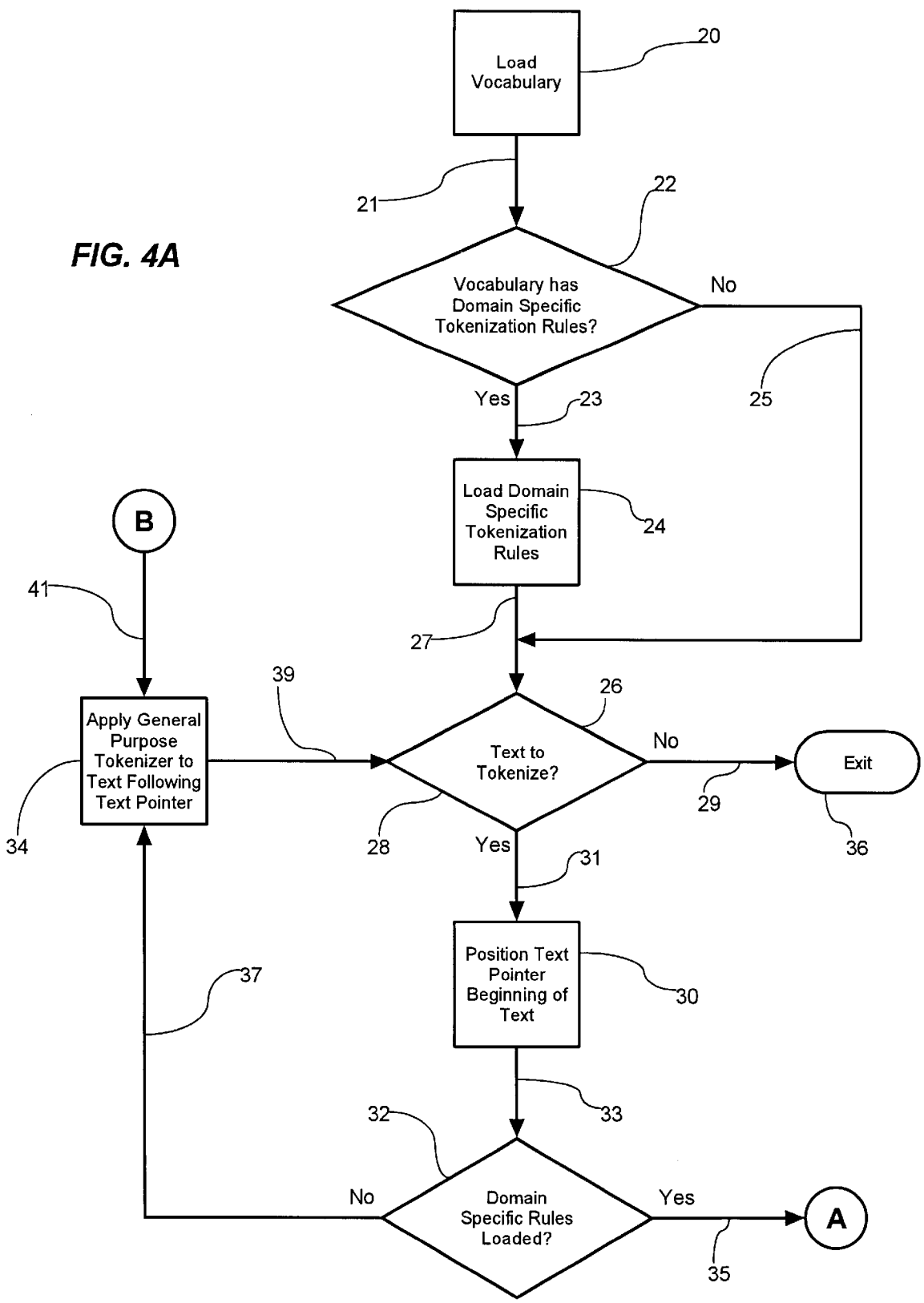
FIGS. 4A and 4B, taken together, are a flow chart illustrating a process for supporting customized tokenization of domain-specific text.
Figure 4B:
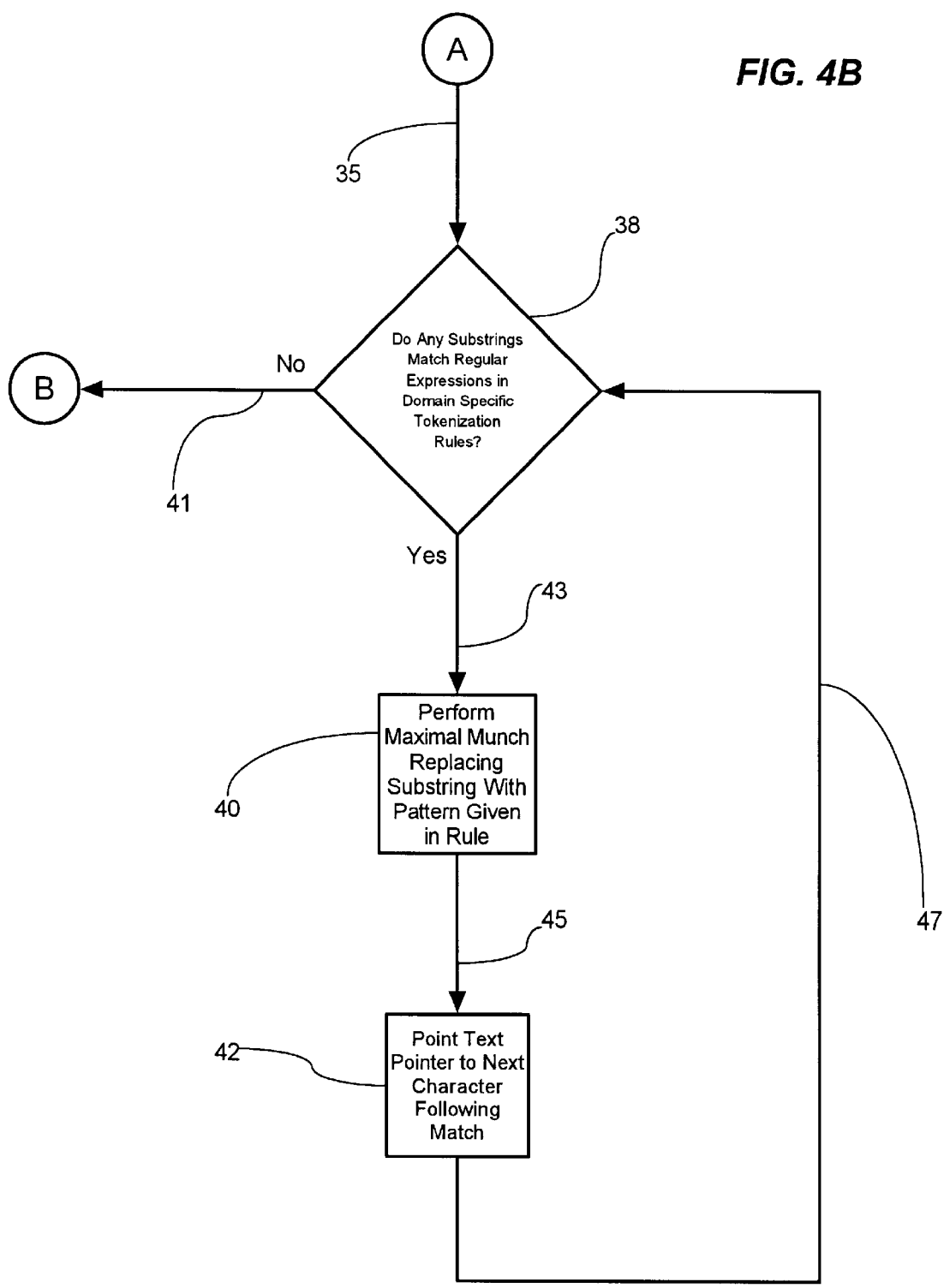

FIGS. 4A and 4B, taken together, are a flow chart illustrating a process for supporting customized tokenization of domain-specific text. In FIG. 4A, the method in accordance with the inventive arrangements begins in block 20 in which the active vocabulary 12 is loaded. Following path 21 to decision block 22, if vocabulary 12 includes domain-specific tokenization rules 14 for use with customized vocabulary database 15, the inventive method preferably can load the domain-specific tokenization rules 14 in block 24. Following path 27 to decision block 27, if no domain-specific text remains to be tokenized, the inventive method terminates along path 29 in exit block 36. But, if in decision block 27 domain-specific text remains to be tokenized, following path 31 to block 30, the inventive method positions a text pointer at the beginning of the domain-specific text to be tokenized. Following path 33 to decision block 32, if domain-specific tokenization rules 14 have not been identified in block 22 and loaded in block 24, the inventive method simply passes the text to be tokenized to general purpose tokenizer 13 for general purpose tokenization, before returning along path 39 to decision block 26. In contrast, if in decision block 32, domain-specific tokenization rules 14 have been identified in block 22 and loaded in block 24, the inventive method continues along path 35 to jump circle A leading to decision block 38 in FIG. 4B, where the inventive method preferably can preprocess the domain-specific text according to domain-specific tokenization rules 14.

With reference to FIG. 4B, if, in decision block 38, any substrings pointed to by the text pointer match regular expressions contained in the domain-specific tokenization rules 14, following path 43 to block 40, the inventive method can replace the first and longest matching substring with a replacement pattern corresponding to the regular expression matched in decision block 38, the replacement being referred to generically as a maximal munch. Subsequently, following path 45 to block 42, the inventive method can advance the text pointer to the next character following the matched regular expression. Returning along path 47 to decision block 38, the inventive process preferably repeats until no more substrings pointed to by the text pointer match regular expressions contained in the domain-specific tokenization rules 14. In that event, following path 41 to jump circle B leading to block 34 in FIG. 4A, the inventive method passes the preprocessed text to general purpose tokenizer 13 for general purpose tokenization, before returning along path 39 to decision block 26.

Thus, the inventive arrangements negate the need to distribute a vocabulary requiring special tokenization without a vocabulary-specific tokenizer. Moreover, the inventive arrangements further free the vocabulary developer from the burden of distributing a domain-specific vocabulary with a vocabulary-specific tokenizer. Rather, the present invention permits vocabulary developers to distribute with the vocabulary, only domain-specific tokenization rules to be applied during a preprocessing step. Consequently, vocabulary developers need not obtain proprietary knowledge of the internal speech recognition system Moreover, the present invention, inherently, is language independent. Thus, the present system provides for a flexible customized tokenization system, capable of processing vocabulary-specific tokenization schemes while treating all vocabularies uniformly.

What is claimed is:

1. A method for supporting customized tokenization of a segment of domain-specific text comprising the steps of:

loading domain-specific tokenizaticn rules corresponding to said customized tokenization of said segment of domain-specific text;

fully tokenizing said segment of domain-specific text using said loaded domain-specific tokenization rules; and, further fully tokenizing said fully tokenized segment of domain-specific text using general purpose tokenization rules.

2. The method according to claim 1, wherein said loading step comprises:

loading a speech recognition vocabulary; and, loading domain-specific tokenization rules corresponding to said speech recognition vocabulary.

3. The method according to claim 1, wherein said loading step comprises:

first loading an active vocabulary;

identifying domain-specific tokenization rules corresponding to said active vocabulary; and, second loading said domain-specific tokenization rules identified in said identifying step.

4. The method according to claim 1, wherein said tokenizing step comprises:

identifying each substring in said domain-specific text matching a regular expression having a corresponding replacement pattern in said loaded domain-specific tokenization rules; and, replacing each substring identified in said identifying step with said replacement pattern corresponding to said matched regular expression.

5. The method according to claim 3, wherein said tokenizing step comprises:

checking for said second loaded domain-specific tokenization rules; and, processing said domain-specific text using said second loaded domain-specific tokenization rules only if said second loaded domain-specific tokenization rules are identified in said checking step.

6. The method according to claim 5, wherein said processing step comprises:

identifying each substring in said domain-specific text matching a regular expression having a corresponding replacement pattern in said second loaded domain-specific tokenization rules; and, replacing each substring identified in said identifying step with said replacement pattern corresponding to said matched regular expression.

7. The method according to claim 5, wherein said processing step comprises:

identifying substrings in said domain-specific text matching a regular expression having a corresponding replacement pattern in said second loaded domain-specific tokenization rules;

excluding from further processing said identified substrings having a do-not-replace marker associated with said identified substring; and, replacing each non-excluded identified substring with said replacement pattern corresponding to said matched regular expression.

8. A computer apparatus programmed with a routine set of instructions stored in a fixed medium, said computer apparatus comprising:

means for loading domain-specific tokenization rules corresponding to a customized tokenization of a segment of domain-specific text;

first means for fully tokenizing said segment of domain-specific text using said loaded domain-specific rules; and, second means for further fully tokenizing said segment of domain-specific text using general purpose tokenization rules.

9. The computer apparatus according to claim 8, wherein said loading means comprises:

first means for loading a speech recognition vocabulary; and, second means for loading domain-specific tokenization rules corresponding to said speech recognition vocabulary.

10. The computer apparatus according to claim 8, wherein said loading means comprises:

first means for loading an active vocabulary;

means for identifying any domain-specific tokenization rules corresponding to said active vocabulary; and, second means for loading said domain-specific tokenization rules identified by said identifying means.

11. The computer apparatus according to claim 8, wherein said first tokenizing means comprises:

means for identifying each substring in said domain-specific text matching a regular expression having a corresponding replacement pattern in said loaded domain-specific tokenization rules; and, means for replacing each substring identified by said identifying means with said replacement pattern corresponding to said matched regular expression.

12. The computer apparatus according to claim 10, wherein said first tokenizing means comprises:

means for checking for said loaded domain-specific tokenization rules; and, means for processing said domain-specific text using said loaded domain-specific tokenization rules only if said loaded domain-specific tokenization rules are identified by said checking means.

13. The computer apparatus according to claim 12, wherein said processing means comprises:

means for identifying each substring in said domain-specific text matching a regular expression having a corresponding replacement pattern in said loaded domain-specific tokenization rules; and, means for replacing each substring identified by said identifying means with said replacement pattern corresponding to said matched regular expression.

14. The computer apparatus according to claim 12, wherein said processing means comprises:

means for identifying substrings in said domain-specific text matching a regular expression having a corresponding replacement pattern in said loaded domain-specific tokenization rules;

means for excluding from further processing said identified substrings having a do-not-replace marker associated with said identified substring; and, means for replacing each non-excluded identified substring with said replacement pattern corresponding to said matched regular expression.

15. A system for supporting customized tokenization of a segment of domain-specific text in a speech recognition system comprising:

a loader for loading domain-specific tokenization rules corresponding to said segment of domain-specific text;

a first domain-specific tokenizer for fully tokenizing said segment of domain-specific text according to said loaded domain-specific tokenization rules; and, a second general purpose tokenizer for further fully tokenizing said fully tokenized segment of text.

16. The system according to claim 15, wherein said loader comprises:

a vocabulary loader for loading a customized vocabulary database; and, a rule loader for loading a domain-specific tokenization rules database corresponding to said customized vocabulary database.

17. The system according to claim 16, wherein said first tokenizer comprises a customized tokenizer for tokenizing said domain-specific text according to said domain-specific tokenization rules database corresponding to said customized vocabulary database.

* * * * *